(12) United States Patent
Shull et al.

(10) Patent No.: US 6,755,108 B2
(45) Date of Patent: Jun. 29, 2004

(54) RETURN MECHANISM FOR A SLIDE MITER SAW

(75) Inventors: Steven A. Shull, Parkville, MD (US); Daryl S. Meredith, Hampstead, MD (US); John C. Arechaga, Lansdale, PA (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/229,749

(22) Filed: Aug. 28, 2002

(65) Prior Publication Data

US 2004/0040430 A1 Mar. 4, 2004

(51) Int. Cl.[7] ................................................. B27B 5/18
(52) U.S. Cl. .......................... 83/588; 83/471.3; 83/581; 225/39; 225/47; 33/761
(58) Field of Search ....................... 83/588, 589, 471.2, 83/471.3, 581; 225/39, 46, 47, 51; 33/761, 767

(56) References Cited

U.S. PATENT DOCUMENTS

| 2,310,838 A | * | 2/1943 | Helprin ..................... 83/588 X |
| 3,045,724 A | * | 7/1962 | Mitchell .................... 83/588 X |
| 3,209,635 A | * | 10/1965 | Auld ......................... 83/588 X |
| 3,232,159 A | * | 2/1966 | Stanley ...................... 83/589 X |
| 4,553,463 A | * | 11/1985 | Engel ........................ 83/589 X |
| 5,138,920 A | * | 8/1992 | Mayfield ..................... 83/471.2 |
| 5,152,207 A | * | 10/1992 | Mayfield ............... 83/471.3 X |
| 5,787,779 A | * | 8/1998 | Garuglieri ................. 83/589 X |
| 5,820,005 A | * | 10/1998 | Perkitny et al. .............. 225/65 |
| 5,943,931 A | * | 8/1999 | Stumpf et al. ......... 83/471.3 X |
| 6,067,885 A | * | 5/2000 | Brunson et al. ........... 83/471.3 |
| 6,272,764 B1 | * | 8/2001 | Lin ............................. 33/767 |

* cited by examiner

Primary Examiner—Charles Goodman
(74) Attorney, Agent, or Firm—Adan Ayala

(57) ABSTRACT

A miter saw includes a base, a table, a support housing connected to the table, at least one rail slidably connected to the support housing, a trunnion disposed on the at least one rail, a saw assembly pivotally attached to the trunnion and movable between a front position and a rear position, the saw assembly comprising a motor and a blade driven by the motor, and a return mechanism disposed on one of the trunnion and the support housing for returning the saw assembly to the rear position. The return mechanism may include a spool, a cable disposed on the spool, and a spring for biasing the spool to a first rotational position, the cable being connected to the other of the trunnion and the support housing.

14 Claims, 2 Drawing Sheets

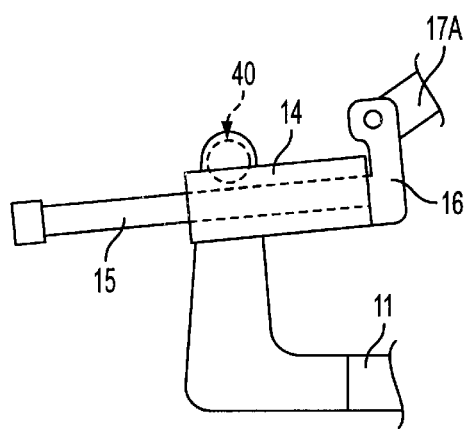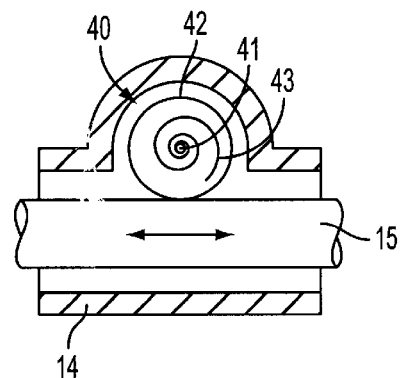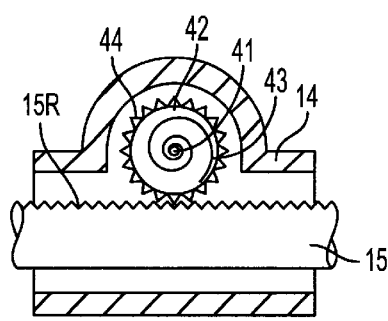
FIG. 3    FIG. 4A
FIG. 4B

RETURN MECHANISM FOR A SLIDE MITER SAW

FIELD OF THE INVENTION

This invention relates generally to slide miter saws and specifically to return mechanisms for slide miter saws.

BACKGROUND OF THE INVENTION

Slide miter saws are well known in the art as they provide extended cutting range over non-sliding miter saws. Like non-sliding miter saws, the slide miter saws have a base, a rotatable table attached to the base, a saw assembly including a motor and a blade driven by the motor, where the saw assembly is pivoted downwardly for cutting a workpiece disposed on the base and table. However, slide miter saws enable the user to move the saw assembly horizontally along the table.

Most slide miter saws accomplish this by connecting the saw assembly to at least one rail, which is slidably attached to a support housing connected to the table (see, e.g., U.S. Pat. No. 6,067,885). With such arrangement, the user would pull the saw assembly forwardly, move the saw assembly downwardly, then push the saw assembly rearwardly for cutting the workpiece. It is desirable to provide a mechanism to return the saw assembly to the rearward position.

SUMMARY OF THE INVENTION

In accordance with the present invention, an improved miter saw is employed. The miter saw includes a base, a table, a support housing connected to the table, at least one rail slidably connected to the support housing, a trunnion disposed on the at least one rail, a saw assembly pivotally attached to the trunnion and movable between a front position and a rear position, the saw assembly comprising a motor and a blade driven by the motor, and a return mechanism disposed on one of the trunnion and the support housing for returning the saw assembly to the rear position. The return mechanism may comprise a spool, a cable disposed on the spool, and a spring for biasing the spool to a first rotational position, the cable being connected to the other of the trunnion and the support housing.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 2 illustrates the return mechanism found in the embodiment of FIG. 1, where

FIG. 3 is a partial side view of a second embodiment of a slide miter saw according to the invention; and FIGS. 4A–4B are partial cross-sectional views of two return mechanisms used in the embodiment FIG. 3.

DETAILED DESCRIPTION

Figure 1:
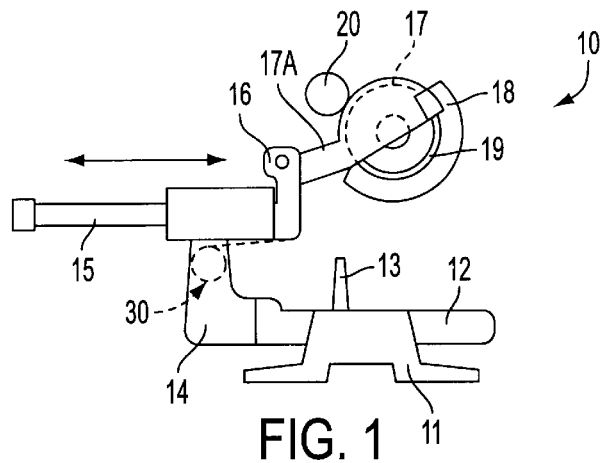
FIG. 1 is a side view of a first embodiment of a slide miter saw according to the invention.

The invention is now described with reference to the accompanying figures, wherein like numerals designate like parts. Referring to FIG. 1, a slide miter saw 10 preferably has a base 11, a table 12 rotatably connected to the base 11, a support housing 14 pivotally connected to table 12, at least one (and preferably two) rail(s) 15 slidably connected to the support housing 14, a trunnion 16 attached to one end of the rail(s) 15, and a saw assembly pivotally attached to trunnion 16 via pivot arm 17A, where the saw assembly comprises a motor 20, a blade 19 driven by the motor, an upper blade guard 17 for covering an upper part of blade 19, and a lower blade guard 18 pivotally attached to the upper blade guard 17 for covering a lower part of blade 19. The slide miter saw 10 may also have a fence 13 attached to the base 11. These elements are well known in the art. Persons skilled in the art are referred to U.S. Pat. No. 6,067,885, which is wholly incorporated by reference herein.

Figure 2A:
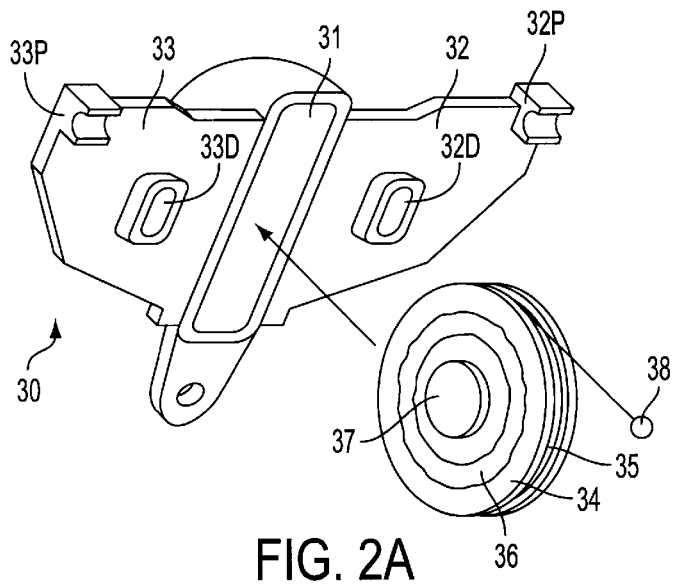
FIGS. 2A–2B are an exploded view and an assembled view of the return mechanism, respectively.
Figure 2B:
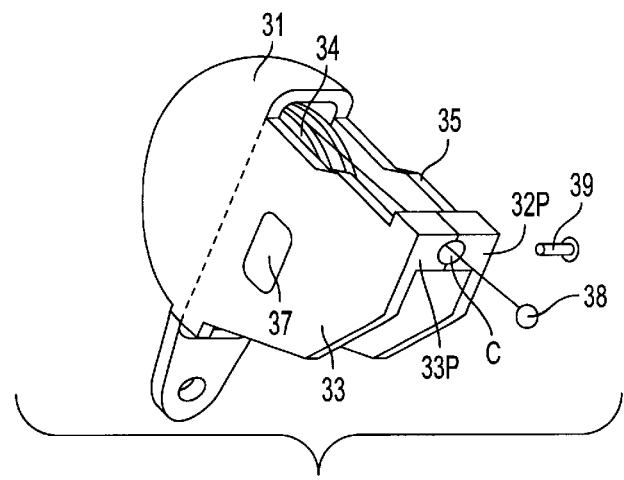

A return mechanism 30 is preferably provided within support housing 14. Referring to FIGS. 1–2, return mechanism 30 preferably includes a spool assembly which comprises an axle 37, a spool 34 disposed on axle 37, a cable 35 attached to and wrapped around spool 34, and a spring 36 connected to axle 37 and spool 34.

The spool assembly in turn is preferably disposed in a housing 31, which is preferably made of plastic. Housing 31 may have two flaps 32, 33 that can be folded over the spool assembly. Preferably, each flap has a corresponding post 32D, 33D, which receive axle 37 when flaps 32, 33 are folded. It is preferable that axle 37 and posts 32D, 33D have a matching profile, such as a double-D profile, so that the axle 37 cannot rotate about its longitudinal axis.

Flaps 32, 33 may also have corresponding protrusions 32P, 33P, which engage when flaps 32, 33 are folded over the spool assembly. A screw 39 can hold both flaps 32, 33 together. Alternatively, a snap-fit may hold both flaps 32, 33 together. Protrusions 32P, 33P may define a channel C through which cable 35 extends therethrough.

The spool assembly and housing 31 can then be attached with screws unto support housing 14. Preferably, the spool assembly and housing 31 are substantially surrounded by the support housing 14 to prevent dust from entering therein. Accordingly, cable 35 would extend through and exit support housing 14.

Cable 35 may have a cylinder or ball 38 for connecting cable 35 to trunnion 16. Trunnion 16 may have a hook, clip, channel, etc., for holding ball 38.

With such arrangement, as the user moves the saw assembly towards a front position, trunnion 16 pulls cable 35, which causes spool 34 to rotate relative to axle 37. Thus tension on spring 36 is increased. When the user lets go of the saw assembly, spring 36 causes spool 34 to rotate in the opposite direction, retracting cable 35 (and thus trunnion 16 and the saw assembly). Persons skilled in the art, however, should recognize that return mechanism 30 can be disposed on trunnion 16, while cable 35 may be connected to support housing 14 to obtain the same result.

Another advantage of the above-described return mechanism is that it is easy to install, thus enabling users to retrofit their slide miter saws.

An alternate embodiment of a slide miter saw with return mechanism is shown in FIGS. 3–4, where like numerals refer to like parts. In this embodiment, return mechanism 40 is preferably disposed within support housing 14 and contacts at least one rail 15.

Referring to FIG. 4A, return mechanism 40 has an axle 41 rotationally fixed to (or relative to) support housing 14, a spool 42 disposed on axle 41, and a spring 43 connected to axle 41 and spool 42. Spool 42 can rotate relative to axle 41.

Spool 42 preferably contacts rail 15, and may have a high friction surface, such as rubber, etc. As the user moves the saw assembly towards a front position, rail 15 which causes spool 42 to rotate relative to axle 41. Thus tension on spring 43 is increased. When the user lets go of the saw assembly, spring 43 causes spool 42 to rotate in the opposite direction, retracting rail 15 (and thus the saw assembly).

Because it is desirable to minimize slippage between spool 42 and rail 15, it may be advantageous to provide rail 15 with a rack 15R that meshes with teeth 44 disposed on spool 42, as shown in FIG. 4B.

Persons skilled in the art may recognize other additions or alternatives to the means disclosed herein. However, all these additions and/or alterations are considered to be equivalents of the present invention.

We claim:

1. A miter saw comprising:

a base;

a table rotatably disposed on the base;

a support housing connected to the table;

at least one rail slidably connected to the support housing, said at least one rail having a longitudinal axis and being slidable in a substantially horizontal direction along the longitudinal axis;

a trunnion disposed on the at least one rail;

a saw assembly pivotally attached to the trunnion and movable between a front position and a rear position, the saw assembly comprising a motor and a blade driven by the motor; and a return mechanism disposed on one of the trunnion and the support housing for returning the saw assembly to the rear position.

2. The miter saw of claim 1, wherein the return mechanism comprises a spool, a cable connected to and disposed on the spool, and a spring for biasing the spool to a first rotational position, the cable being connected to the other of the trunnion and the support housing.

3. The miter saw of claim 2, wherein the return mechanism further comprises an axle, wherein to spool is rotatably disposed on the axle, and the spring is connected to the spool and the axle.

4. The miter saw of claim 3, wherein the return mechanism further comprises a housing supporting the axle.

5. The miter saw of claim 1, wherein the return mechanism comprises an axle connected to the support housing, a spool rotatably attached the axle, and a spring connected to the axle and the spool, wherein the spool contacts the at least one rail.

6. The miter saw of claim 5, wherein to at least one rail has a rack and the spool has teeth that mesh with the rack.

7. The miter saw of claim 5, wherein the spool has a high-friction contact area for contacting the at least one rail.

8. A return mechanism for a slide miter saw comprising:

a housing;

an axle supported byte housing;

a spool rotatably disposed on the axle;

a cable connected to and disposed on the spool;

a spring connected to the axle and the spool; and wherein the housing has two foldable flaps folding over the axle.

9. The return mechanism of claim 8, wherein the flaps fix the rotational position of the axle.

10. The return mechanism of claim 8, wherein the cable has a means for attaching the cable to a portion of a miter saw.

11. The return mechanism of claim 10, wherein the attaching means is a ball.

12. A return mechanism for a slide miter saw comprising:

a housing;

an axle supported by the housing;

a spool rotatably disposed on the axle;

a cable connected to and disposed on the spool;

a spring connected to the axle and the spool; and wherein the cable has a ball for attaching the cable to a portion of the miter saw.

13. The return mechanism of claim 12, wherein the housing has two foldable flaps folding over the axle.

14. The return mechanism of claim 13, wherein the flaps fix the rotational position of the axle.

\* \* \* \* \*